United States Patent [19]
Laing

[11] 3,741,631
[45] June 26, 1973

[54] RADIATION INCIDENCE CONTROL MEANS

[76] Inventor: Nikolaus Laing, Aldingen near Stuttgart, Hofener, Germany

[22] Filed: Mar. 11, 1971

[21] Appl. No.: 123,210

[30] Foreign Application Priority Data
Mar. 16, 1970 Switzerland.......................... 3853/70

[52] U.S. Cl...................... 350/267, 47/17, 350/272
[51] Int. Cl. ............................................. G02f 1/30
[58] Field of Search ............... 47/17; 350/266, 267, 350/269, 271, 272

[56] References Cited
UNITED STATES PATENTS
2,415,226   2/1947   Sziklai................................ 350/272

*Primary Examiner*—Edward S. Bauer
*Attorney*—Willis H. Taylor, Robert McKay et al.

[57] ABSTRACT

The described invention makes use of at least two screens which have complementary transparent and opaque patterns and which are relatively movable towards and away from each other so that when adjacent they obturate radiation and when separated they pass it. Thus radiation, for example upon a plant-cultivation area or into a green house, is controllable. Selective filtration may be used to control selected parts of the spectrum. The operation is preferably by inflating and deflating spaces between the screens at least one of which is pliable.

5 Claims, 4 Drawing Figures

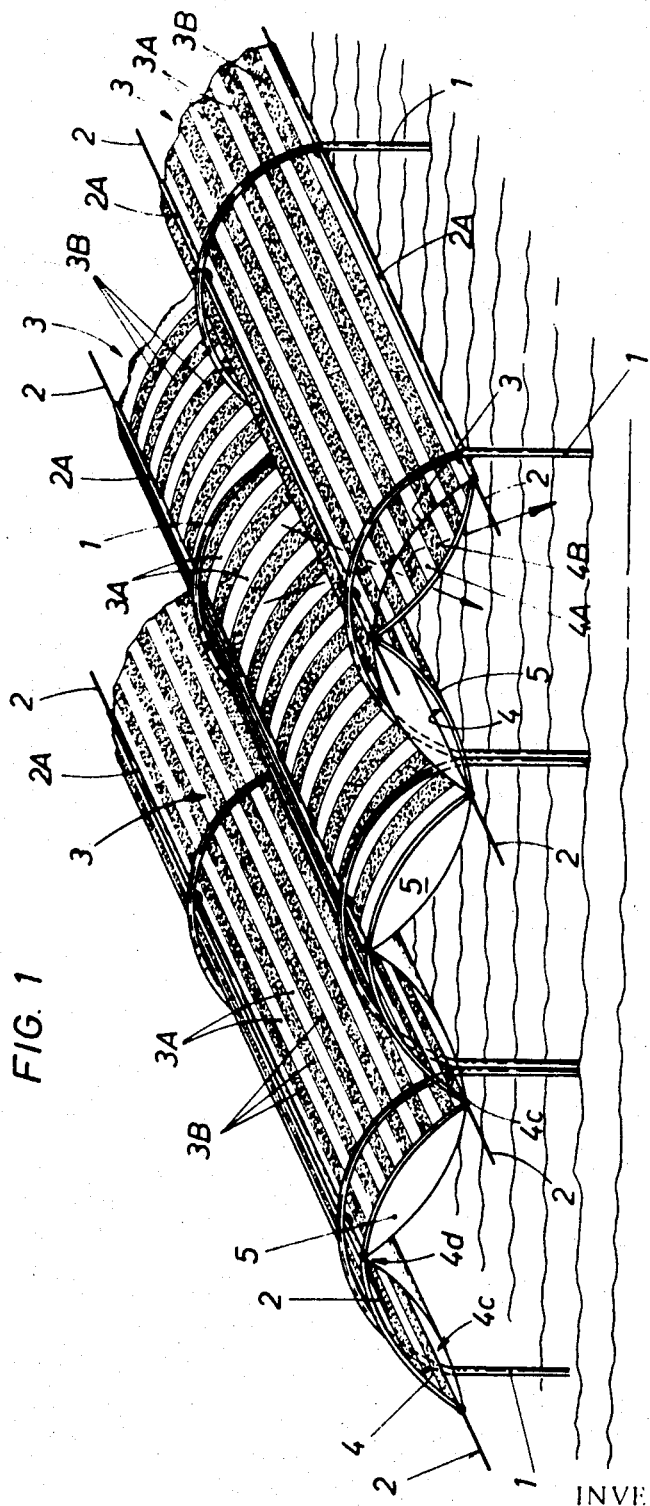

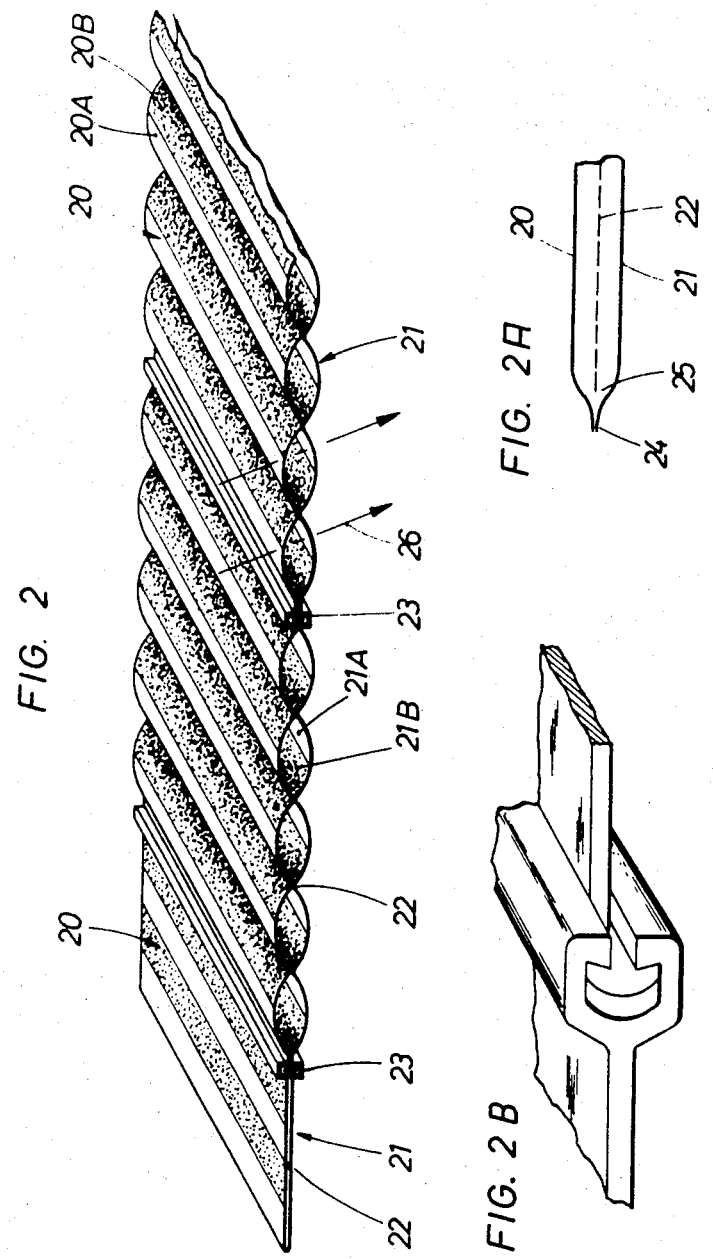

RADIATION INCIDENCE CONTROL MEANS

OBJECTS OF THE INVENTION

This invention relates to the control of the incidence of radiation, primarily solar radiation. Its primary purpose is to control shading in a building or over an area which is used for plant cultivation, but as will be seen, it may have other uses.

It is known that the majority of crop plants discontinue assimilation in full sunlight, and it may therefore be advantageous partially or wholly to shade their place of growth during all or part of the cycle of sunshine from direct sunlight, leaving it exposed to sky light at other times. It may also be desirable to afford such variable shade selectively, e.g. to pass radiant heat one way but to interrupt re-radiation and therefore cooling. Again there may be situations, not necessarily associated with plant cultivation, in which it is required to control the incidence of actinic light. By using in the context of the invention appropriate filtering, controllable selective shading may be achieved. The invention includes a method of controlling the incidence of radiation on a given area, e.g. an area of plant cultivation.

The invention may take the form of a roof or wall, or a panel, or of a false roof beneath transparent glass or plastics of ordinary kind.

GENERAL DESCRIPTION OF THE INVENTION

According to the invention there are provided means for controlling radiation comprising two screens coextensive over the area required to be controlled, the screens having complementary (and preferably approximately equal-area) transparent and opaque patterns such that when the screens lie adjacently they are collectively more (or totally) opaque and when separated they are collectively transparent to incident radiation, there being means to bring them adjacent or to separate them. The words "transparent" and "opaque" have the meaning herein of being effectively transparent or opaque to such of the radiation spectrum as is required to be controlled. For example, the so-called opaque area may be virtually totally reflective, or be selectively filtering e.g. passing some visible light but not all or passing infrared but not ultraviolet, and so forth. Further the word "transparent" is intended to cover translucent or diffusive; indeed in some cases diffusion of the incident radiation may be desirable.

The means for moving the screens between adjacency and separation in one form of the invention comprise means for controllably inflating or deflating spaces between the screens, the screens or one of them being flexible, for example being of non-porous material such as thin plastics sheet.

In a preferred form, a first screen is virtually immobile — and may be the external roof of a building or a canopy over an area — a second screen is arrayed within or beneath the first and is flexible and mobile, and a third immobile screen is provided within or beneath the second so as to form an air chamber between itself and the second, inflation of which chamber urges the second screen from its separated to its adjacent position relative to the first screen.

Control of the operational means may be manual or automatic; if the latter it is envisaged as a system in which one or more photoelectric cells by suitable relay operate the control of a source of compressed air, or switch a blower on or off. The pressure used in a pneumatic system need, of course, only be very low since all that has to be done is to inflate what amounts to a very light pliable bag-like space and to make up for any leakage.

The invention may be embodied as a unit of which a plurality may be used in a modular assembly. Since the whole structure can be of very light weight it may be erected temporarily where required.

The air supplied to operate the screens may be conditioned, e.g. warmed to prevent frost or snow lying on the outer screen and/or dried to avoid condensation.

DESCRIPTION OF THE DRAWINGS

Two examples of the invention are illustrated by the accompanying drawings, and in one of these (FIG. 1) a minor variation is also indicated.

FIG. 1 is a perspective view of a canopy in a form which may be used over large areas of cultivated ground, FIG. 2 illustrates in perspective a panel, intended primarily for use inside an existing green house, and FIGS. 2A and 2B are enlarged views of an end of a panel constructed according to FIG. 2.

DETAILED DESCRIPTION OF THE INVENTION

In FIG. 1 there is illustrated a structure comprising a number of arches 1 between which extend strong tension wires or cables, as at 2, which may be protectively sheathed in plastic tubes, indicated at 2 A, of which as many as necessary are provided to support an outer first screen or roof 3 of sheet plastics material. Screen 3 transparent in stripes 3 A and opaque in alternating stripes 3 B. By way of illustration of a minor variation the middle section of the three shown, for convenience marked 3$^x$, has its stripes running transversely whilst the other two are striped longitudinally. The opaque stripes 3 B are indicated by some of them being shown dotted. The screen 3 may be of rigid plastics glass, or flexible plastics sheet. The opaque stripes 3 B are preferably constituted by metal-vapor deposition (and in such case be highly reflective) or by pigmentation of the plastics material, or as may otherwise be expedient. As previously indicated, the opacity may be by way of selective filtration e.g. to exclude actinic light.

Beneath the screen 1 is a second screen 4 supported by the wires 2. Each arched section of screen 4 is supported along its lower margins at 4 C and along the zenith of the respective arch at 4 D. The screen 4 is of thin flexible plastics sheet and is striped in complementary manner to the corresponding screen 1, by transparent stripes 4 A and opaque stripes 4 B.

In the simplest form of the invention according to this example, the space or pocket between screens 3 and 4 is alternatively exhausted, so that screen 4 comes up and lies or abuts against screen 3, or relaxed so that it hangs down. When adjacent or abutting its opaque stripes 4 B coincide with the transparent stripes 3 A completely obturating the undesired radiation. When relaxed screen 4 is, of course, separated from screen 3 and the radiation, both direct and diffused, can pass (an indication of this is given by the arrows in the right-hand arch in FIG. 1).

However, it is preferred to employ a third screen 5. This is similarly suspended along the lines 4 C, 4 D but is immobile. It is transparent and its purpose is to form an air chamber or pocket between itself and screen 4 which is controlledly inflated. Inflation moves screen 4 into adjacency with screen 3, with the effect above described.

Obviously if partial obturation of radiation is required, screen 4 may be held in a position such that the stripes pass some but not all of the radiation: this may be achieved by careful control of the operating air flow, through some continuous billowing movement of screen 4 is to be expected since its intermediate condition is unlikely to be stable. As a further alternative, it is possible to use a transparent outer plastics screen 3, while the opaque or reflecting stripes 4 and 5 have juxtaposed stripes like 3 B.

In the air duct between the outer screen 3 and the inner screen 5 air pressure gives rigidity to the walls. Holes for rain water can be provided along the cables 2. By use of heated air it is possible to melt snow.

Turning now to FIG. 2, there is illustrated a variant of the invention, which adapts it to use in the form of a panel-like construction such as may be useful within a green house or where a more complex or permanent structure is not required. It can be used also to cover large fields or gardens, either by forming the outer wall of an inflated building or supported by rods, cables or archs as shown in FIG. 1. In this example there are two screens of thin pliable plastics, 20 and 21, and they are juxtaposed and are united along seams 22 (for example by welding). Between seams each area of screen is striped transparently as at 20 A, 21 A and opaquely as at 20 B, 21 B. Instead of one opaque stripe 20 B the area can be divided into many opaque and transparent stripes as shown in FIG. 1. Each pair of such screens may be attached to neighboring pairs by rigid sliding channel elements 23. The inter-attachements as such may be of any convenient type, for example sliding-clasp fasteners or any other kind of zippers could be used. The spaces between the screens, being pockets defined by the seams at 22 (which may be interrupted to permit air to pass from one pocket to the next) are commonly connected to a controllable source of compressed air, not shown, which may comprise flexible ducting formed by further seaming of the screens 20, 21 along their other margins. FIG. 2 A represents, in section, how this is proposed to be done. Here are seen the two screens 20, 21 and in broken line a seam 22. The margins of the screens are seamed together at 24 as by welding, thus forming a duct 25 communicating with all the pockets. There will of course be some wrinkling of the screens in this region, but it is unimportant. The duct 25 is connected as may be convenient to the air supply. When deflated so that the (see left-hand part of FIG. 2) the stripes 20 b, 21 B form a virtually continuous opaque area the screens 20, 21 being positioned in close adjacency. When the pockets are inflated, the staggered relation of the stripes allows radiation to pass (see arrow 26).

I claim:

1. Radiation incidence control means comprising first and second screens each extending over a predetermined area upon which incidence of radiation is to be controlled, each said screen having transparent and opaque patterns with the opaque pattern of one screen overlying the transparent pattern of the other screen when said screens are in abutting relationship throughout, said screens being inter-attached to form a plurality of pockets therebetween with the screens in the area of each pocket being complementary transparent and opaque, and means for inflating said pockets to separate the portions of the screens forming said pockets.

2. Radiation incidence control means for controlling incidence of radiation onto a predetermined area, comprising a first screen extending over said area, a second screen which is flexible underlying said first screen and extending over said area, each said first and second screens having transparent and opaque patterns with the opaque pattern of one screen underlying the transparent pattern of the other screen when said screens are in abutting relationship, and controllable means to move portions of said screens forming a pocket therebetween relatively towards and away from each other by controllably inflating and deflating said pocket whereby when said portions are moved relatively towards each other, the incidence of radiation on said area is reduced and whereby when the portions are moved relatively away from each other, the incidence of radiation on said area is increased.

3. Radiation incidence control means according to claim 2 wherein said screens are non-porous.

4. Radiation incidence control means according to claim 3 wherein said screens form a modular unit and have in addition connection means at one end whereby said unit may be joined to other similar modular units.

5. Radiation incidence control means according to claim 2 wherein said first screen is immobile and having in addition a third screen which is immobile and transparent underlying said second screen and extending over said predetermined area with said third screen being attached to said second screen to form a pocket therebetween, and means for deflating and inflating the pocket between said third and second screens whereby said second screen may be moved towards and away from said first screen.

* * * * *